(12) United States Patent
Bercich

(10) Patent No.: US 8,007,554 B2
(45) Date of Patent: Aug. 30, 2011

(54) APPARATUS AND METHOD FOR THE PURIFICATION OF AIR ENTERING ANIMAL TRANSPORT VEHICLES

(76) Inventor: Giovanni Bercich, Giraween (AU)

( * ) Notice: Subject to any disclaimer, the term of this patent is extended or adjusted under 35 U.S.C. 154(b) by 266 days.

(21) Appl. No.: 12/438,136

(22) PCT Filed: Feb. 21, 2007

(86) PCT No.: PCT/AU2007/001196
§ 371 (c)(1),
(2), (4) Date: Feb. 19, 2009

(87) PCT Pub. No.: WO2008/022382
PCT Pub. Date: Feb. 28, 2008

(65) Prior Publication Data
US 2010/0170398 A1 Jul. 8, 2010

(30) Foreign Application Priority Data
Aug. 21, 2006 (AU) ................................ 2006904552

(51) Int. Cl.
*B01D 50/00* (2006.01)
(52) U.S. Cl. ............. 55/337; 55/385.3; 55/394; 55/413; 55/423; 55/447; 55/461; 55/466

(58) Field of Classification Search .................... 55/337, 55/385.3, 394, 413, 423, 434, 447, 466
See application file for complete search history.

(56) References Cited

U.S. PATENT DOCUMENTS
2,267,706 A * 12/1941 Baile et al. ...................... 96/316
* cited by examiner

*Primary Examiner* — Robert A Hopkins
(74) *Attorney, Agent, or Firm* — Molins & Co

(57) ABSTRACT

An air purifier (10) for an animal transport vehicle, such as a horse float (12), has a first air flow passageway (22) for receiving air and directing it in a first direction, and a second air flow passageway (40) continuous with the first air flow passageway and adapted to direct air received from the first air flow passageway in a second direction substantially opposite to the first direction. There is a bend region (42) joining the first and second air flow passageways where the change in the direction of air occurs. An air egress passageway (34) has an opening (36) adjacent the bend region so as to divert some of the air therethrough. The passageway (34) is so configured as to create a venturi effect on the diverted air. A filter (43) is located downstream of the second air flow passageway (40) and is mounted across an opening of the transport vehicle so that air flowing through the second air flow passageway is filtered before entering the transport vehicle.

10 Claims, 4 Drawing Sheets

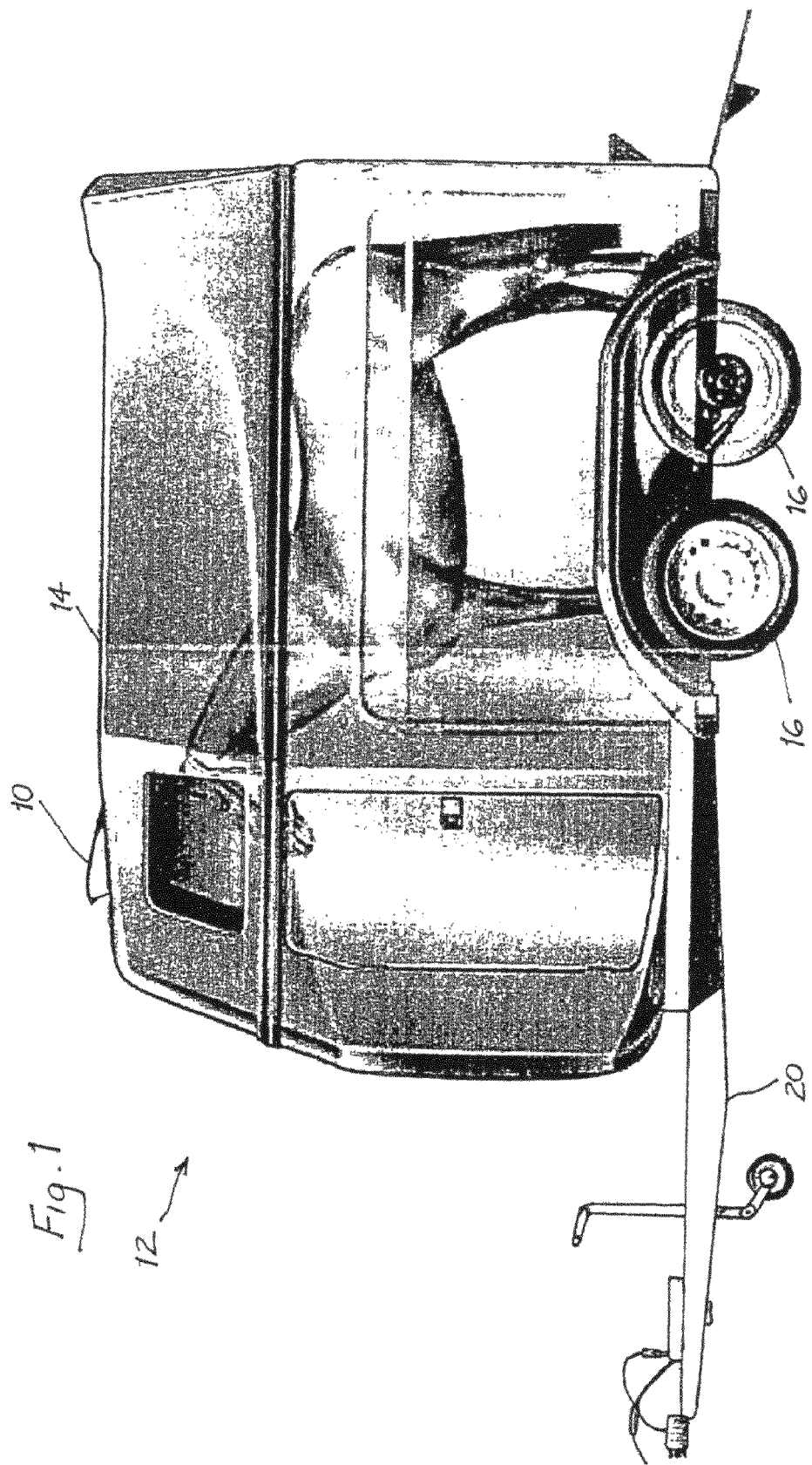

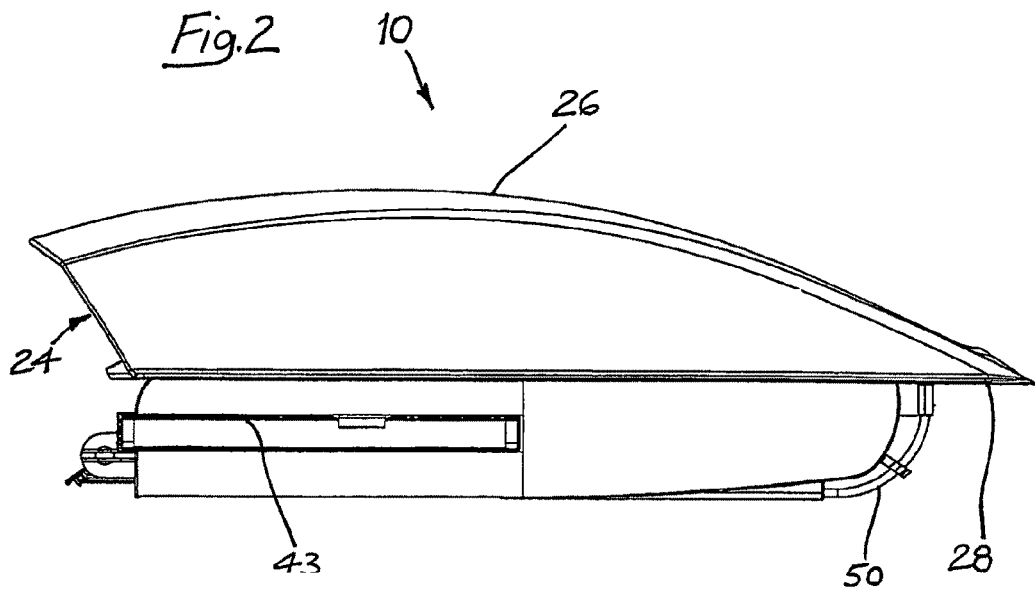
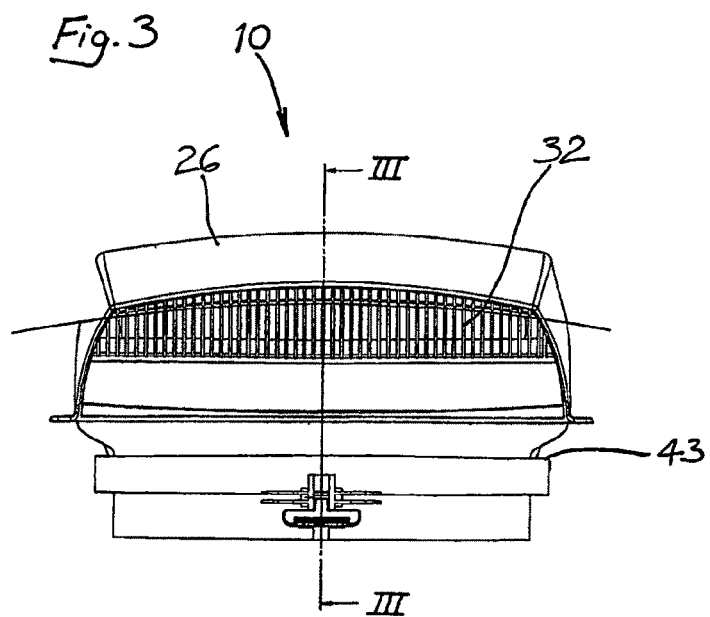

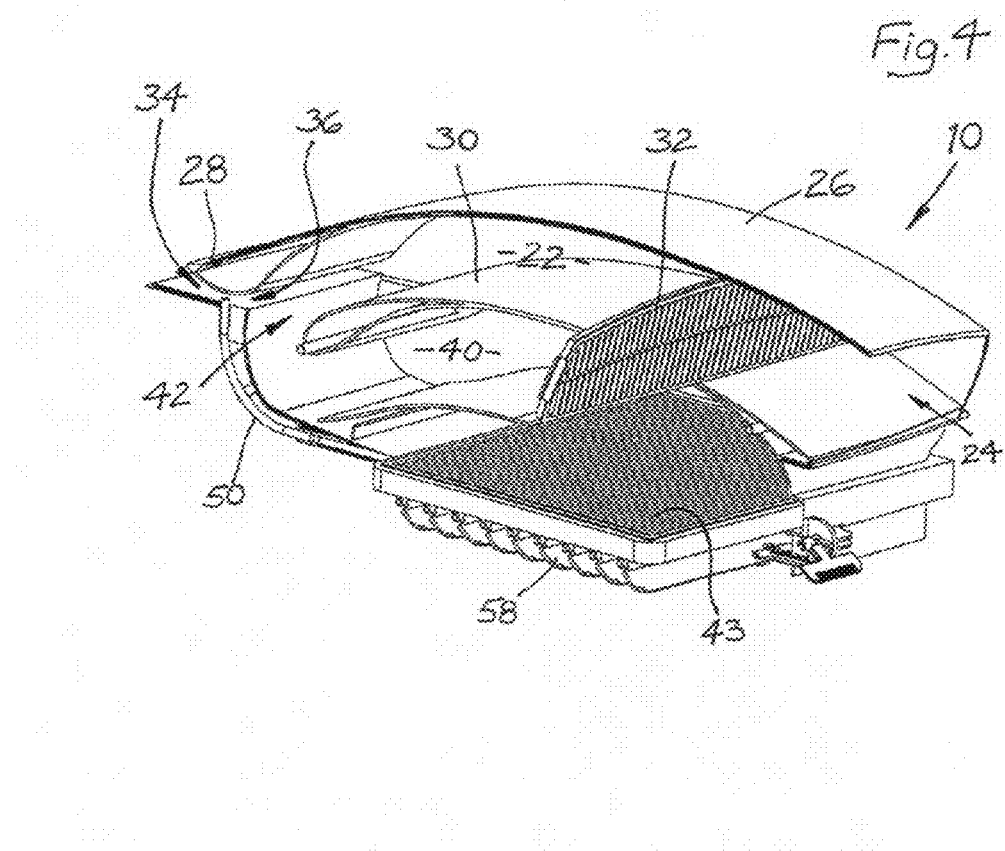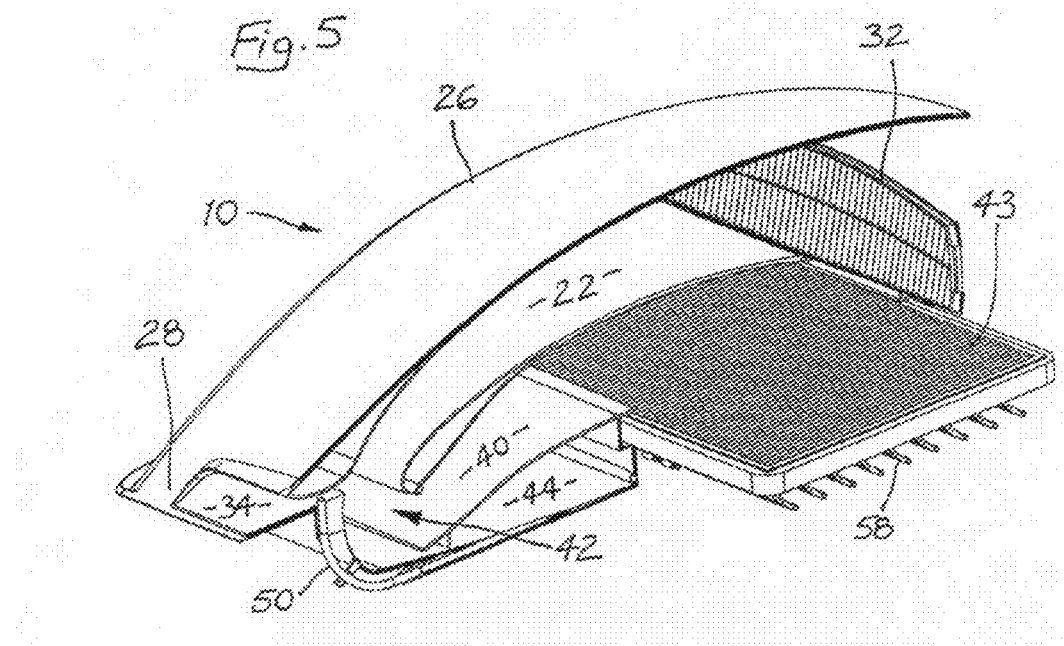

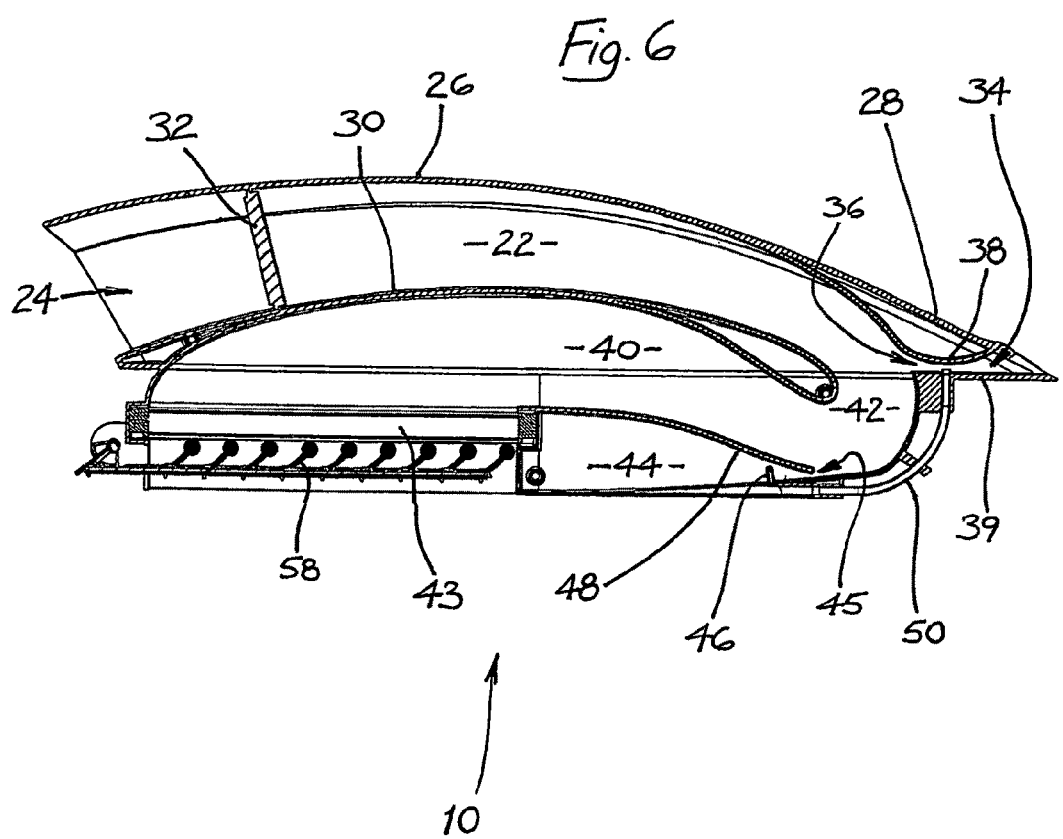

APPARATUS AND METHOD FOR THE PURIFICATION OF AIR ENTERING ANIMAL TRANSPORT VEHICLES

FIELD OF THE INVENTION

The present invention relates to an apparatus and method for the purification of air entering animal transport vehicles and, in particular, to an air purifier that collects air flowing over a moving vehicle for transporting horses, purifies the collected air and delivers the purified air to the interior of the vehicle.

Although the background and preferred embodiments of the invention will be hereinafter described with reference to an apparatus and method for the purification of air entering horse transport vehicles, commonly known as horse floats, it is to be understood that the invention is not limited thereto but has wider application. For example, the air purifier may be used on dog trailers or on a cargo compartment of a truck or other transport vehicle.

It is to be understood that the terminology employed herein is for the purpose of description only and should not be regarded as limiting. For instance, the terms "comprising" or "comprises" are to be understood as meaning "including", unless otherwise stated. Also, the term "air" is to be understood, in the particular context in which it is used, and so may include contaminants of air, such as small foreign objects, particles, liquids and gasses that flow with the air.

BACKGROUND OF THE INVENTION

Providing a clean source of air for an animal in a towed vehicle is a problem that has been known for many years. Horses, for example, are normally transported to and from competitive racing events in horse floats that are not very well ventilated or are too exposed to harmful exhaust emissions from the towing vehicle.

It is well known that, particularly on long journeys, prolonged exposure to exhaust fumes, soot particles and gases such as carbon monoxide from the towing vehicle and to airborne pollutants from other sources affects the horse and will have a significant detrimental impact on the horse's level of comfort and health, as well as its subsequent competitive performance. This is particularly pronounced on long, straight highways and on windless days, where horse floats travel within an envelope of noxious fumes and suspended particles that blanket the entire roadway.

Horse floats are known to be provided with windows, louvers, or vents, but these are only capable of admitting ambient air with whatever contaminants are present in that ambient air.

No apparatus or methods of the prior art are known that can efficiently and reliably purify air entering a horse float.

SUMMARY OF THE INVENTION

It is a primary object to the present invention to provide an air purifier for an animal transport vehicle, such as a horse float, a dog trailer and a cargo compartment of a truck, that can direct and filter the surrounding air into the moving vehicle in such a manner that it has been purged of harmful vehicle exhaust emissions or other airborne contaminants.

It is yet another object of the present invention to overcome or substantially ameliorate the disadvantages and shortcomings of the aforementioned prior art, or at least provide a useful alternative.

According to the present invention, there is provided an air purifier for an animal transport vehicle, comprising a first air flow passageway for receiving air and directing it in a first direction, a second air flow passageway continuous with the first air flow passageway and adapted to direct air received from the first air flow passageway in a second direction substantially opposite to the first direction, a bend region joining the first and second air flow passageways where the change in the direction of air occurs, an air egress passageway having an opening adjacent the bend region so as to divert some of the air therethrough and being so configured as to create a venturi effect on the diverted air, and a filter located downstream of the second air flow passageway and mounted across an opening of the transport vehicle so that air flowing through the second air flow passageway is filtered before entering the transport vehicle.

Preferably, the cross sectional area of the first air flow passageway decreases from an entry port through which the air is received to the bend region.

It is preferred that the first air flow passageway includes a protective grille adjacent the entry port and located thereacross to prevent entry of large foreign objects with the received air.

In a preferred form, the cross sectional area of the second air flow passageway increases from the bend region to the filter.

The air purifier preferably includes a reservoir for collecting water that enters with the received air, the reservoir having an opening downstream of the bend region so as to receive the water therethrough.

A drain tube is preferably connected between the reservoir and the air egress passageway so as to draw water collected in the reservoir into the air egress passageway by a negative pressure formed by the venturi effect.

Preferably, the air egress passageway has a curved ceiling above a planar floor, the curved ceiling including a first ceiling region proximal to the opening that, with the planar floor, defines a narrowing in the flow path of air through the air egress passageway, and a second ceiling region distal to the opening that, with the planar floor, defines a widening in the flow path of diverted air through the air egress passageway.

The filter may be an activated carbon filter.

In a further preferred form, the filter is carried on a replaceable cartridge.

The air purifier may also include adjustable guide vanes that are located adjacent an outlet side of the filter so as to control the direction of filtered air flow into the transport vehicle or so as to prevent air flow into the transport vehicle, as required.

There has been thus outlined, rather broadly, the more important features of the invention in order that the detailed description thereof that follows may be better understood and put into practical effect, and in order that the present contribution to the art may be better appreciated.

There are additional features of the invention that will be described hereinafter. As such, those skilled in the art will appreciate that the conception, upon which the disclosure is based, may be readily utilized as the basis for designing other apparatus and methods for carrying out the objects of the present invention. It is important, therefore, that the broad outline of the invention described above be regarded as including such equivalent constructions in so far as they do not depart from the spirit and scope of the present invention.

SUMMARY OF THE DRAWINGS

The invention will be better understood and objects other than those set forth above will become apparent when consideration is given to the following detailed description thereof. Such description makes reference to the accompanying drawings, in which:

FIG. 1 is a side elevation of a horse float incorporating an air purifier according to a preferred embodiment of the invention, FIG. 2 is a side elevation of the air purifier shown in FIG. 1, FIG. 3 is a front elevation of the air purifier shown in FIG. 2, FIG. 4 is a front perspective sectional view through section shown in FIG. 3, FIG. 5 is a rear perspective sectional view through section III-III shown in FIG. 3, FIG. 6 is a side sectional view through section III-III shown in FIG. 3.

DESCRIPTION OF PREFERRED EMBODIMENTS

With reference now to the above summarized drawings of FIGS. 1 to 6, an air purifier embodying the principles and concepts of the present invention and generally designated by the reference numeral 10 will now be described.

The air purifier 10 is mounted to a horse float 12 comprising a compartment 14 that is supported above two wheel sets 16. The compartment is pulled by a hitch or goose neck assembly 20. The compartment has a rear access door for the horse and a separate side door for a person. Horse floats of this type typically have brake and parking lights that are wired into the towing vehicle's electrical system. The compartment may be provided with openable windows, vents or louvers that, if required, allow ambient or unfiltered flow of air additionally into the compartment.

The air purifier 10 improves the quality of air within the compartment and is sealingly mounted into an opening cut into a forward region of the roof of the compartment. The air purifier may also be mounted on the front or a side wall of a compartment. An upper portion of the air purifier adapted to receive air and channel it ready for filtering protrudes from the roof and a lower portion of the air purifier adapted to filter the channeled air and release it into the compartment is located within the compartment.

As shown specifically in FIGS. 2 to 6, the air purifier 10 includes an air scoop passageway 22 (or first air flow passageway) having an entry port 24 for admitting air ahead of the horse float, a streamlined roof 26 to minimize wind resistance, an internal arch shaped floor 30, and a protective grille 32 thereacross and near the entry port to prevent entry of large foreign objects with the admitted air, such as stones, insects and the like. The passageway 22 is forward or upstream of a tail region 28 of the air purifier and is tapered, reducing gradually in cross sectional area as the air flow path approaches the tail region in a rearward direction to the direction of movement of the horse float, thereby causing air flow into this region to be accelerated.

The air purifier 10 also includes a filter passageway 40 (or second air flow passageway) which is in air flow communication with the air scoop passageway 22 via a continuous bend 42 of about 180 degrees between the two passageways. A filter 43 is located downstream of the filter passageway 40. The continuous bend 42 has the effect of applying centrifugal force on any accelerated water and small foreign objects or other material heavier than air material, such as dust, that has not been trapped by the grille 32 and to cause the water and such other material to collide against the outermost walls defining the bend 42, whereupon the water and the other material can then be captured for migration into the tail region from where they can be expelled from the purifier, in ways to be explained below.

The tail region 28 has a small air egress passageway 34 with an opening 36 adjacent the bend 42. In this particular embodiment, the passageway 34 is defined between a curved ceiling 38 and a planar floor 39. The curved ceiling 38 includes a first ceiling region proximal to the opening 36 that, with the planar floor 39, defines a narrowing in the flow path of diverted air through the air egress passageway, and a second ceiling region distal to the opening that, with the planar floor, defines a widening in the flow path of diverted air through the air egress passageway. The air egress passageway 34 is thus configured so as to divert therethrough some of the air flowing from the air scoop passageway to the filter passageway and to create a venturi effect on the diverted air, in this way facilitating the migration of water and other material flowing with the diverted air through the tail region for eventual expulsion from the purifier.

There is a water trap region or reservoir 44 beneath the filter passageway 40 for collecting any water that is not expelled with the air diverted through the air egress passageway 34. The reservoir 44 has an opening 45 that is downstream of the bend 42 so as to receive the water therethrough. A baffle 46 is located adjacent the opening 45 to restrict water movement and so prevent water in the reservoir from spilling out through the opening 45 during movement of the horse trailer. Also, there is a shelf 48 above the reservoir 44 to prevent water from the reservoir splashing out travelling downstream to the filter 43.

At the bottom of the reservoir 44 is an opening to a drain tube 50, which has its other opening through the floor 39 of the air egress passageway 34. The venturi effect created through the air egress passageway 34 forms a negative pressure therein that draws water, including any material dissolved or suspended in water, through the drain tube 50 from the reservoir 44 into the air egress passageway, in this way facilitating the migration of water and other material flowing with the drawn water through the tail region for eventual expulsion from the purifier.

The filter 43 located downstream of the filter passageway 40 is mounted across an opening of the horse float so that air flowing through the passageway is filtered before entering the horse float. The filter 43 is, in this particular embodiment, an activated carbon filter and is carried on a replaceable cartridge.

The filter passageway 40 downstream of the bend 42 is tapered, increasing gradually in cross sectional area as the air flow path approaches the filter 43. Air flow into this region is considerably slowed, allowing it to pass through the filter 43 at low speed and with minimum aerodynamic losses.

The air purifier has pivotally adjustable guide vanes 58 that are located adjacent an outlet side of the filter 43 so as to control the direction of filtered air flow into the horse float or so as to prevent air flow into the horse float, as required by the user of the air purifier.

It will be readily apparent from the above that there are various advantages of the present invention.

It will also be readily apparent to persons skilled in the art that various modifications may be made in details of design and construction of the embodiments of the apparatus and method s for the purification of air entering an animal transport vehicle described above without departing from the scope or ambit of the present invention.

The reference in this specification to any prior publication (or information derived from it), or to any matter which is known, is not, and should not be taken as an acknowledgement or admission or any form of suggestion that that prior publication (or information derived from it) or known matter forms part of the common general knowledge in the field of endeavour to which this specification relates before the filing date of this patent application.

The invention claimed is:

1. An air purifier for an animal transport vehicle, comprising a first air flow passageway for receiving air and directing it in a first direction, a second air flow passageway continuous with the first air flow passageway and adapted to direct air received from the first air flow passageway in a second direction substantially opposite to the first direction, a bend region joining the first and second air flow passageways where the change in the direction of air occurs, an air egress passageway having an opening adjacent the bend region so as to divert some of the air therethrough and being so configured as to create a venturi effect on the diverted air, and a filter located downstream of the second air flow passageway and mounted across an opening of the transport vehicle so that air flowing through the second air flow passageway is filtered before entering the transport vehicle.

2. The air purifier of claim 1 wherein the cross sectional area of the first air flow passageway decreases from an entry port through which the air is received to the bend region.

3. The air purifier of claim 2 wherein the first air flow passageway includes a protective grille adjacent the entry port and located thereacross to prevent entry of large foreign objects with the received air.

4. The air purifier of claim 1 wherein the cross sectional area of the second air flow passageway increases from the bend region to the filter.

5. The air purifier of claim 1 further including a reservoir for collecting water that enters with the received air, the reservoir having an opening downstream of the bend region so as to receive the water therethrough.

6. The air purifier of claim 5 wherein a drain tube is connected between the reservoir and the air egress passageway so as to draw water collected in the reservoir into the air egress passageway by a negative pressure formed by the venturi effect.

7. The air purifier of claim 6 wherein the air egress passageway has a curved ceiling above a planar floor, the curved ceiling including a first ceiling region proximal to the opening that, with the planar floor, defines a narrowing in the flow path of air through the air egress passageway, and a second ceiling region distal to the opening that, with the planar floor, defines a widening in the flow path of diverted air through the air egress passageway.

8. The air purifier of claim 1 wherein the filter is an activated carbon filter.

9. The air purifier of claim 8 wherein the filter is carried on a replaceable cartridge.

10. The air purifier of claim 1 further including adjustable guide vanes that are located adjacent an outlet side of the filter so as to control the direction of filtered air flow into the transport vehicle or so as to prevent air flow into the transport vehicle, as required.

* * * * *